(No Model.) 4 Sheets—Sheet 2.
E. E. DE KALB.
MOUNTING, OPERATING, AND LOCKING SWINGING WINDOWS.
No. 515,520. Patented Feb. 27, 1894.
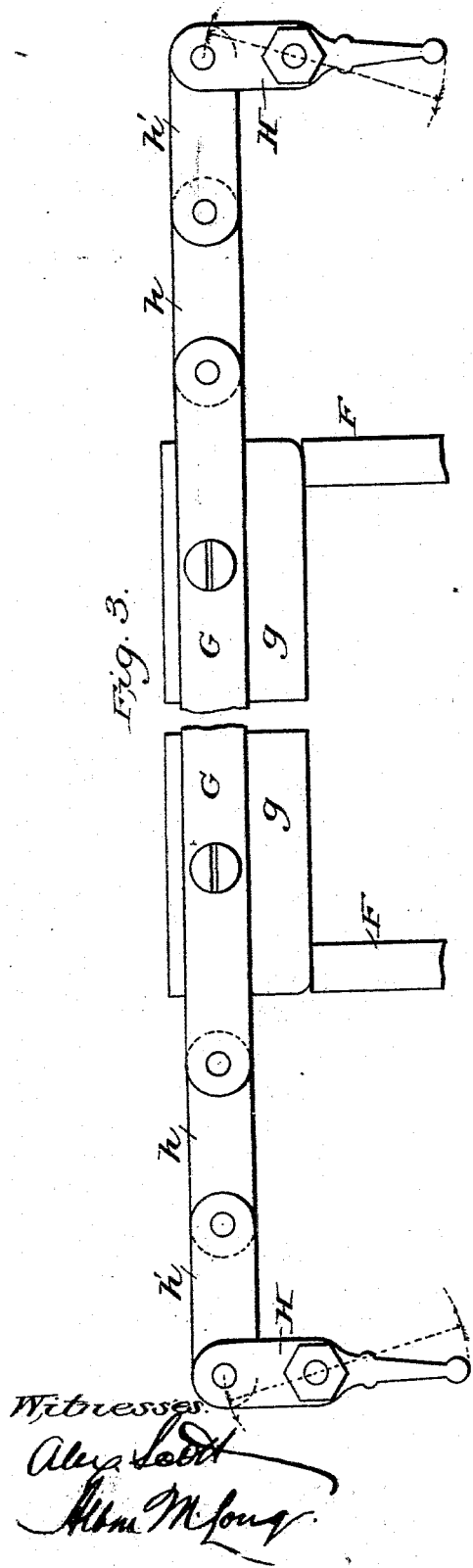
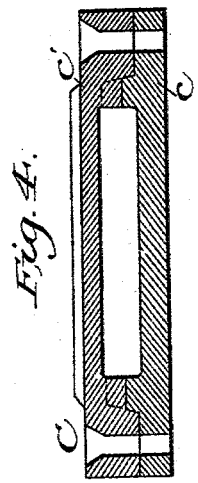
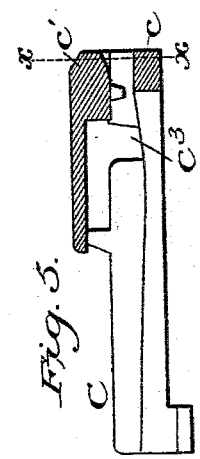
Witnesses:
Inventor:
Enoch E. DeKalb
by F. F. Johnson
Attorney.

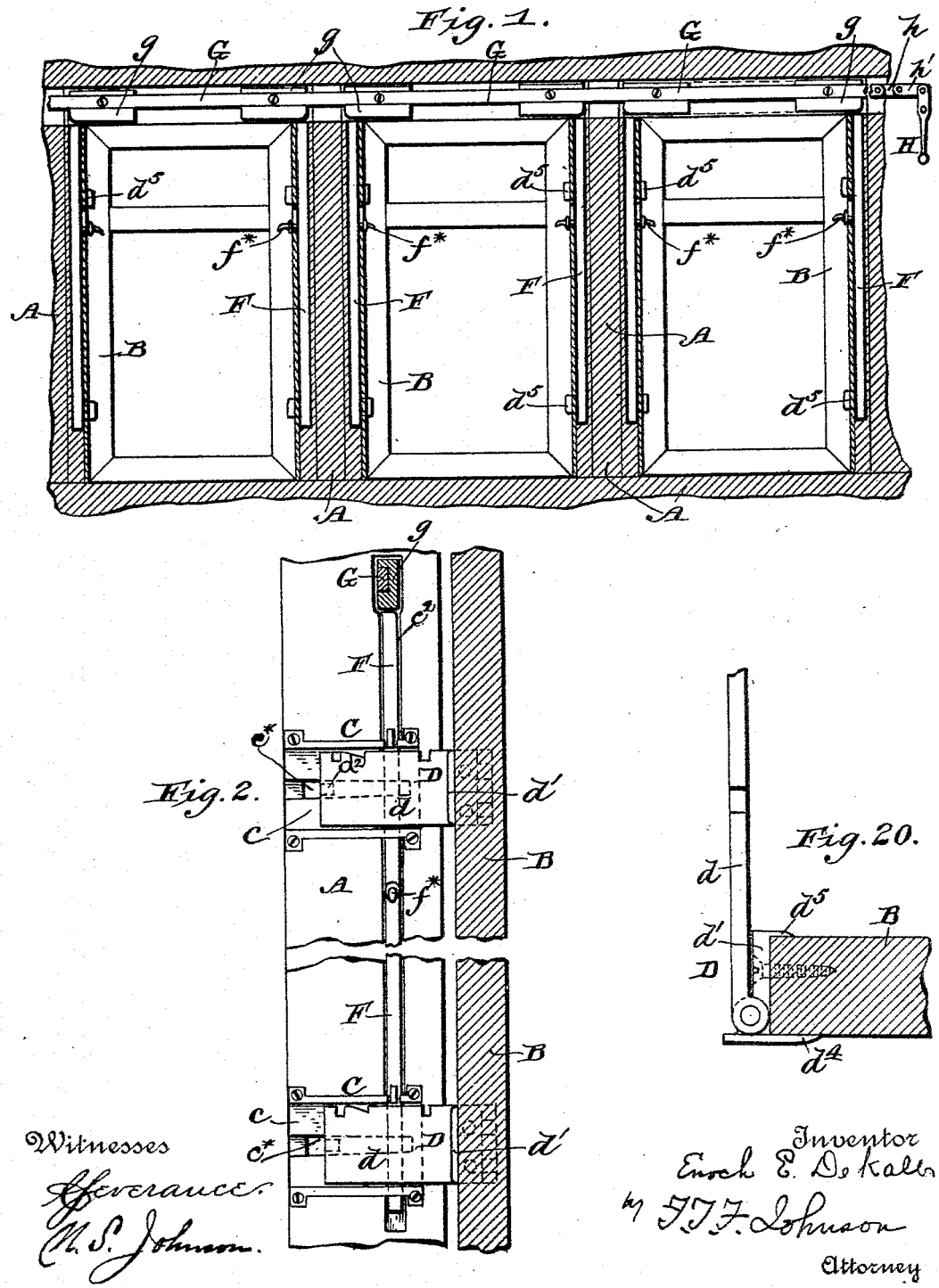

(No Model.) 4 Sheets—Sheet 3.
E. E. DE KALB.
MOUNTING, OPERATING, AND LOCKING SWINGING WINDOWS.
No. 515,520. Patented Feb. 27, 1894.
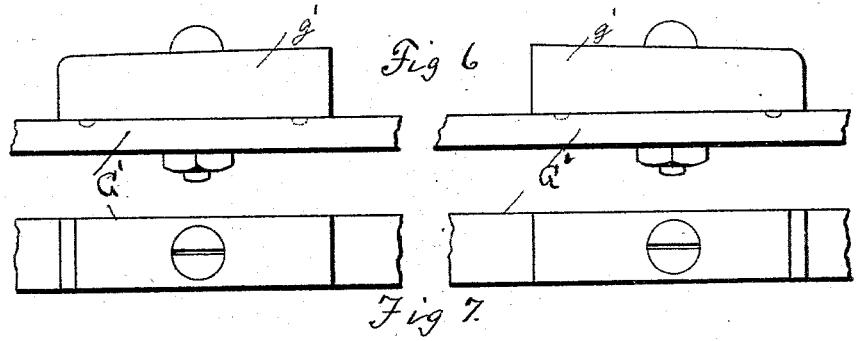
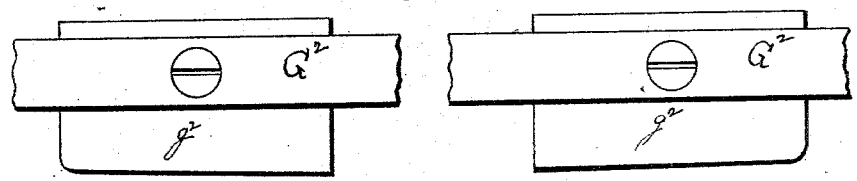
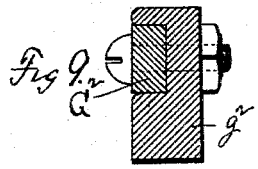
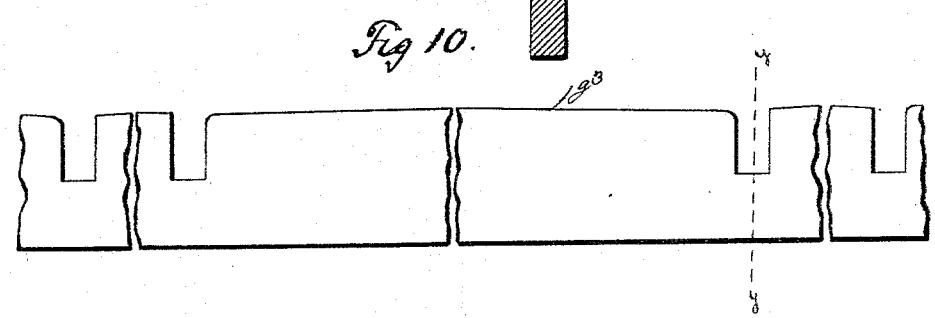
WITNESSES:
INVENTOR,
Enoch E. DeKalb
BY J. J. F. Johnson
ATTORNEY.

(No Model.) 4 Sheets—Sheet 4.
E. E. DE KALB.
MOUNTING, OPERATING, AND LOCKING SWINGING WINDOWS.
No. 515,520. Patented Feb. 27, 1894.
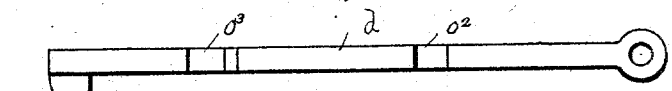
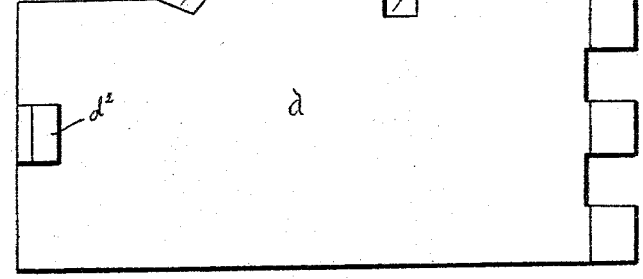
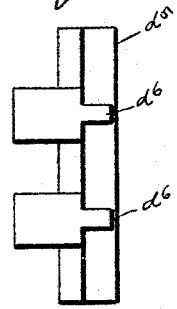
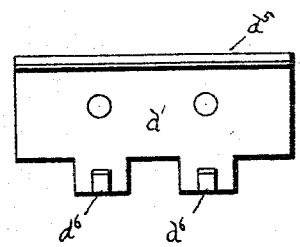
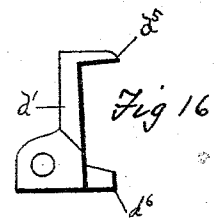
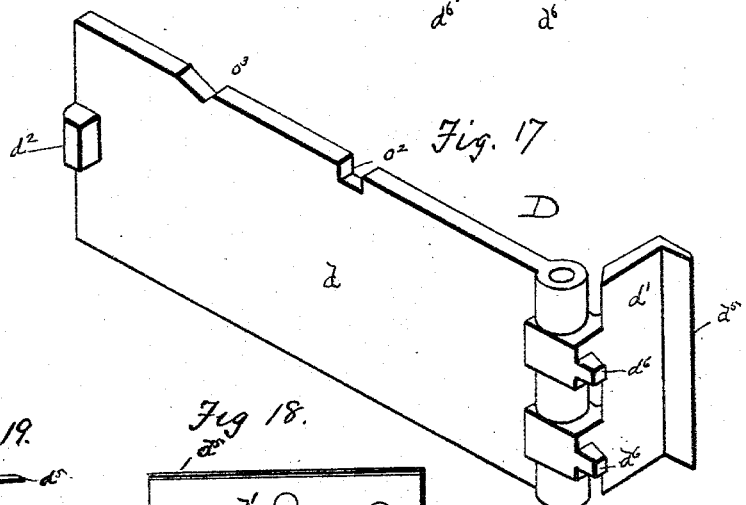
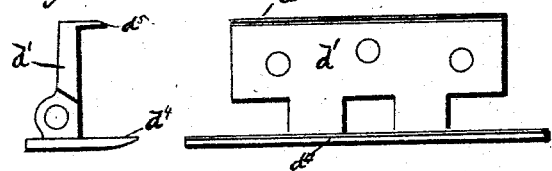
WITNESSES:
Charles E. Allen
C. Severance
INVENTOR,
Enoch E. DeKalb
BY J. J. F. Johnson
ATTORNEY.

UNITED STATES PATENT OFFICE.

ENOCH E. DE KALB, OF SYRACUSE, NEW YORK.

MOUNTING, OPERATING, AND LOCKING SWINGING WINDOWS.

SPECIFICATION forming part of Letters Patent No. 515,520, dated February 27, 1894.

Application filed September 5, 1893. Serial No. 484,868. (No model.)

*To all whom it may concern:*

Be it known that I, ENOCH E. DE KALB, a citizen of the United States, residing at Syracuse, in the county of Onondaga and State of New York, have invented certain new and useful Improvements in Mounting, Operating, and Locking Swinging Windows; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in devices for mounting, operating and locking swinging windows, and relates to improvements on the devices shown, described and claimed in Letters Patent for devices for mounting and operating swinging windows, dated December 2, 1890, No. 441,943, and consists in certain novel improvements in "bracket-slip-hinges" and locking devices whereby said slip hinges are locked at certain predetermined points.

The invention is designed more especially for use on street cars and railway coaches, where all the windows on the same side of the car can be set open to any desired extent and then locked in that position either on one side of the window or the other, or both sides at the same time by my improved locking bar or rod.

The invention further consists in the novel construction and arrangement of the parts hereinafter described, illustrated in the drawings and more particularly pointed out in the claims hereunto appended.

Referring to the drawings: Figure 1 is an elevation of a portion of a railway car having a portion of the inner casing removed, and showing my new locking device applied to the windows. Fig. 2 is an elevation of one side of the window frame having a portion thereof removed, showing the drop bar and hinges in position, with the outer ends of the latter secured to the sash. Fig. 3 is a portion of the locking bar showing the lugs or stops thereon, and the links and levers on the ends thereof. Fig. 4 is a vertical section of the casing, taken on the line $x-x$, Fig. 5. Fig. 5 is a longitudinal section of the casing, showing the construction thereof. Fig. 6 is a top view of one form of lug or stop on the locking bar. Fig. 7 is a side view of the same. Fig. 8 is a side view of another form of lug on the locking bar. Fig. 9 is a cross section of the same showing one way of securing the lugs to the bar. Fig. 10 is a modification of the locking bar. Fig. 11 is a cross section thereof on the line $y-y$, Fig. 10. Fig. 12 is a side elevation of the long leaf of the slip-hinge. Fig. 13 is a top view thereof. Figs. 14, 15 and 16, views showing modifications of the short leaf of the hinge. Fig. 17 is a perspective view of the hinge. Figs. 18 and 19 are views showing the short leaf of my improved slip-hinge. Fig. 20 is a detail view showing the short leaf of the hinge applied to a section of the sash.

Similar letters of reference indicate corresponding parts in all the figures where they occur.

A, A, A, represent the window frames on the same side of a railway or other car, and B, B, B, the sashes therefor.

C is a casing that is secured to the uprights just inside the window frame, and consists of two parts the body $c$ and the plate or cap $c'$ that fits thereon and forms in the said casing a horizontal way in which works a "bracket slip-hinge." Under the cap $c'$ is a vertical groove or channel $c^2$ in which works a drop bar F for securing the hinges in certain predetermined positions. This cap $c'$ is attached to the casing in any suitable manner. The interior of this casing is somewhat curved, as shown in Fig. 5, for the purpose of permitting the slip-hinge a slight lateral play when the window is being opened or closed. The cap $c'$ is provided with lugs $c^3$ on its under side for the purpose of more accurate adjustment to the body $c$.

D represents a "bracket slip-hinge," which consists of the long leaf $d$ and the short leaf $d'$. The long leaf is provided on one end with a stop or lug $d^2$, and on its upper edge with notches $o^2$, $o^3$, the notch $o^2$ has the straight edges and is next to the hinge end of the leaf, while the other notches $o^3$ have, preferably, sloping edges, as shown, and are between the notch $o^2$ and the end of the leaf on which the lug or stop $d^2$ is situated. Instead of two notches, as shown in the drawings, there may be any number desired. The short leaf $d'$ is provided with a plate $d^4$, which, when the leaf is in position on the sash rests on the outside thereof forming a brace for the hinge and prevents the window splitting at that point. On the outer end of the short leaf is a bead or flange $d^5$, which, when the leaf is secured on the sash in proper position rests on the inside of the sash and forms an additional brace for the said hinge. Instead of the plate $d^4$ shown in Figs. 18 and 19, I may use the form of leaf shown in Figs. 15, 16 and 17, in which latter form I use lugs $d^6$ on the under side of the leaf which fit in recesses in the sash. In practice I find that either leaf may be used to advantage, depending somewhat upon the thickness, hardness, &c., of the sash to which it is to be applied. The leaves $d$ and $d'$ are jointed as set forth in the drawings. The long end $d$ of the hinge D fits in the casing C and slides freely to and fro therein, the lug $d^2$ on the leaf $d$, runs in a groove or slot $c^*$ in the casing and prevents the withdrawal of the leaf $d$ from the casing, as is evident. In the use of this device on car windows there are usually four hinges to each window, but there may be a greater number if found desirable, with usually two of the hinges on each side of the window, so that when desired the windows may be opened on either one side or the other, or if desired, entirely removed.

F, F, are drop bars working in vertical grooves within the window frame, and the casings C C secured thereto which casings are fastened to the frame or upright by the cap $c'$ thereof, each of the drop bars is provided with two lugs $f$, $f$, for engagement with the notches $o^2$ or $o^3$ on the upper edge of the long leaf $d$ of the hinge D, as shown in the drawings. This drop bar is provided with a button or knob $f^*$ on the inner face of the frame A, which is secured to the said bar F and by means of which the said bar is raised to release the hinges D, and permit the window to be opened or closed, as desired.

G is a bar placed within the casing of the car and extends nearly the entire length thereof. This bar is placed within the casing just above the windows, and immediately over the upper ends of the vertical drop bars F, and have secured to them lugs or stops $g$, $g$, immediately over the upper ends of the drop bars and in contact therewith, but independent thereof, and are arranged on said bar in about the position shown in the drawings, so that when the bar is moved longitudinally a sufficient distance the lug $g$ will pass from over the top of the drop bar and the latter can then be raised, as is evident. The lugs $g$, $g$, may be of any size or shape, and secured to the bar in any suitable manner. In the drawings I have shown different modifications of this bar which I may use if found desirable.

In Figs. 6 and 7 I have shown a modification of the locking bar. This bar is of the same construction as the bar G above described, except that the lug or stop $G'$ thereon does not extend below the lower edge of the bar, but is flush therewith, as shown in side elevation Fig. 7.

In Fig. 8 I have shown another modification of the locking bar. In this modification the rod or bar $G^2$ instead of having the lug or stop secured to it, the bar $G^2$ is let into the stop $g^2$ and secured therein in any suitable manner, as shown in cross section Fig. 9.

It will be understood that I may dispense with the use of the long locking bar in connection with my device, but I prefer its use as the windows are thereby securely locked in position and cannot be unintentionally displaced.

At the ends of the bar G are links $h$ and $h'$ which connect the bar G with a lever or handle H by means of which the bar G is operated and caused to slide longitudinally to lock and unlock the windows of the car. The lever H may be attached directly to the bar G, or instead of the links $h$ and $h'$ being interposed between the bar and the handle H, I may interpose but one link, but I prefer to interpose the two links, as the liability of the bar being displaced by accident is greatly lessened. Instead of having the short lugs or stops $g$, $g$, as shown in Fig. 1, over each drop bar, there may be one lug or stop $g^3$ extending across the top of the whole window. These lugs may be made integral with the bar as shown in Figs. 10 and 11, or secured thereto, as in the case of the smaller ones.

Having described my invention, what I claim, and desire to secure by Letters Patent, is—

1. The combination of a "slip-hinge" D having a lug and notches on its long leaf, and plate $d^4$ and flange $d^5$ on the short leaf, with a casing C having a horizontal groove therein for the slip hinge and a vertical groove connected with said horizontal groove, as set forth.

2. A slip-hinge composed of two leaves $d$ and $d'$, the leaf $d$ provided with a lug on its end and notches on one edge thereof, and the short leaf $d'$ having a plate $d^4$ on its hinge end, and a bead or flange on the other end, as set forth.

3. The combination of a slip-hinge D having a lug and notches on its long leaf, and plate $d^4$ and flange $d^5$ on the short leaf, a casing C for said slip-hinge having a vertical groove therein, with a drop bar in said vertical groove for engaging and holding the said hinge locked, as set forth.

4. A slip leaf hinge and a drop bar for engaging said hinge, a longitudinal sliding bar having stops or lugs thereon so placed and proportioned as to hold the drop bars in engagement with the hinges on either one side or the other, or both sides of the window, as set forth.

5. A leaf hinge, a drop bar for engaging said hinge, a longitudinal sliding bar with links on both ends, and having stops or lugs thereon so spaced and proportioned as to hold the drop bars in engagement with the hinges on either one side or the other, or both sides of the window, as set forth.

In testimony whereof I affix my signature in presence of two witnesses.

ENOCH E. DE KALB.

Witnesses:
LUCIUS G. LACY,
ALTON SIMMONS.